Patented July 29, 1930

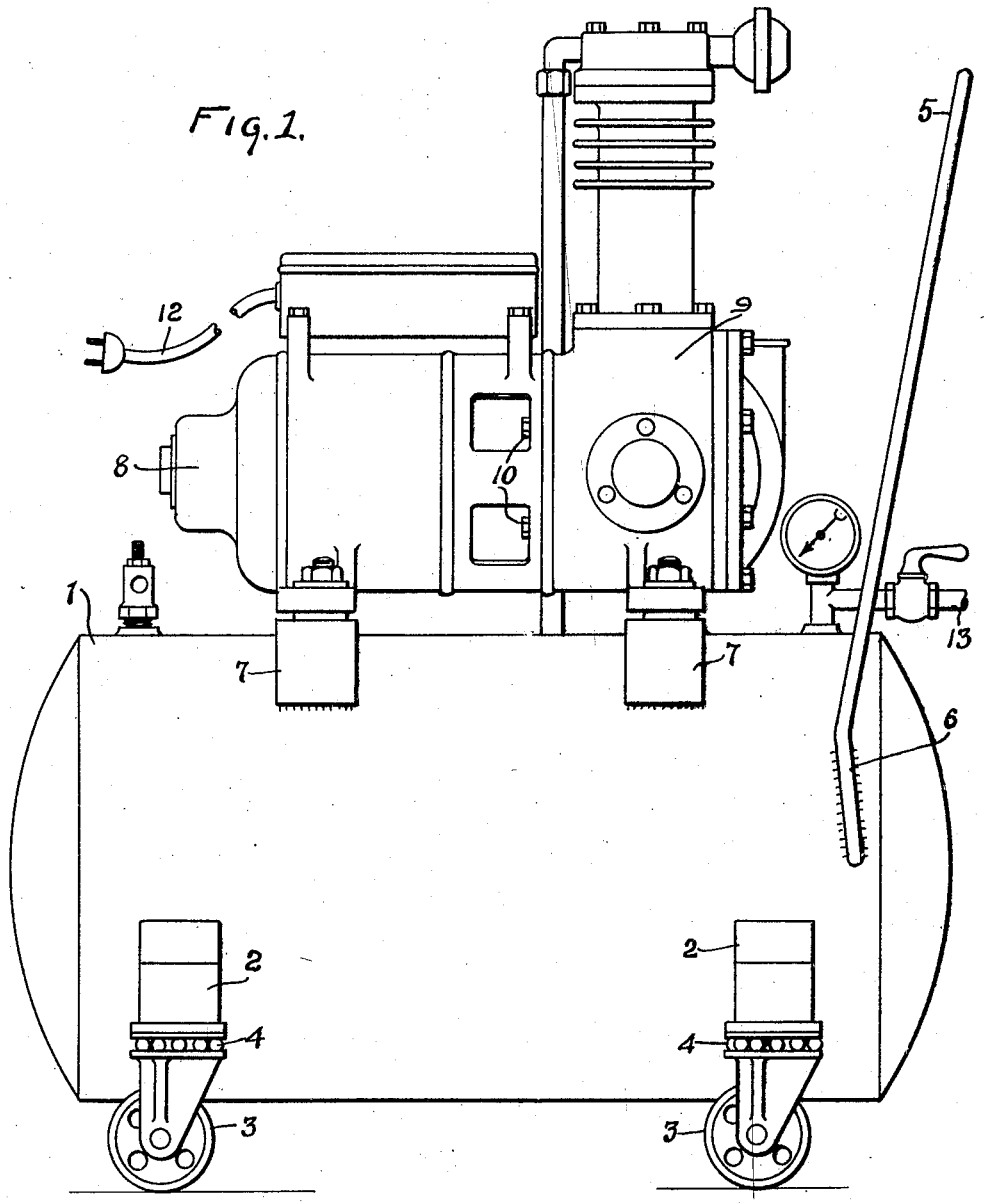

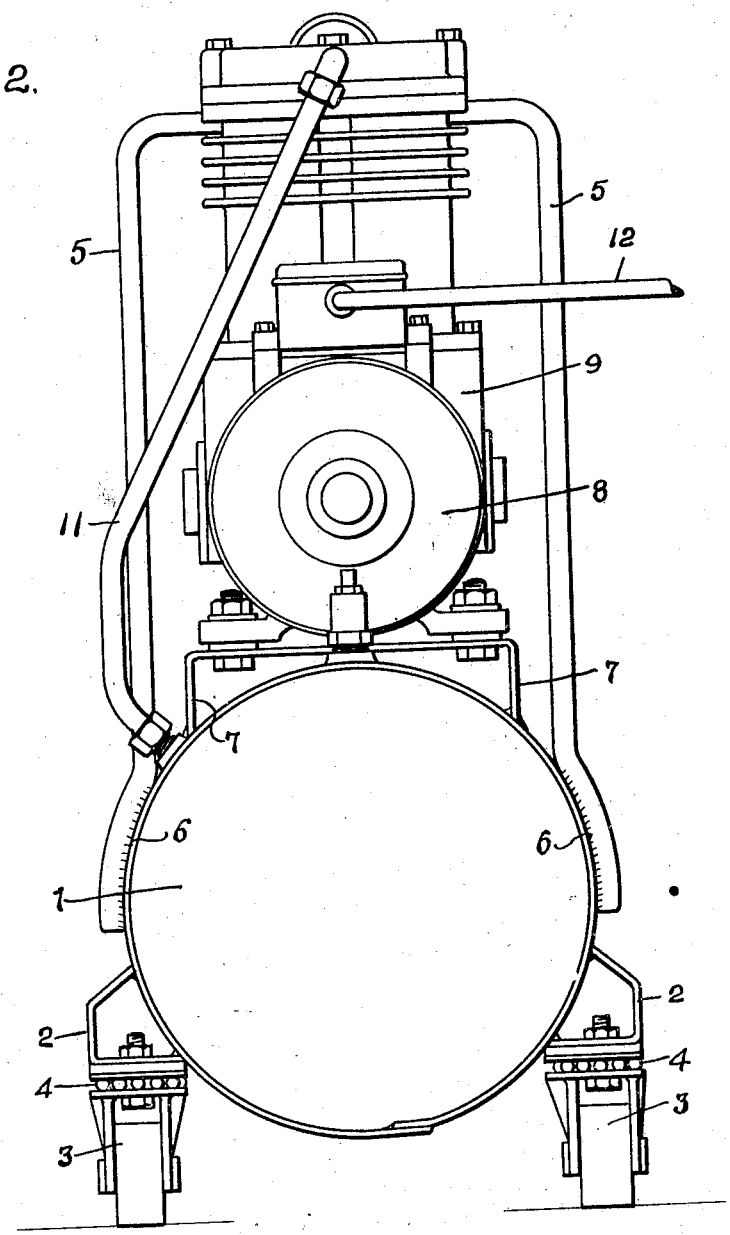

1,771,889

UNITED STATES PATENT OFFICE

EDWARD A. HOBART, OF TROY, OHIO, ASSIGNOR TO THE HOBART BROS. COMPANY, OF TROY, OHIO, A CORPORATION OF OHIO

COMPRESSOR

Application filed August 2, 1928. Serial No. 297,025.

My invention relates to compressors and particularly to portable compressors.

It is the object of my invention to provide a compressor and compressed air tank of unitary form which may be moved as a unit so as to eliminate flexible hose connections between the compressor and the compression tank.

It is a further object to so arrange the unit that it may be easily moved despite its weight and may be guided from place to place by balancing it on two wheels.

It is a further object to provide means of supporting the tank on wheels by directly welding to the tank a handle without weakening the tank and for mounting on the tank the motor and compressor structure thus reducing the space required for the tank and compressor while, at the same time, maintaining a portable unit.

Referring to the drawings:

Figure 1 is a side elevation;

Figure 2 is an end elevation.

Referring to the drawings in detail, 1 is a compressor tank having four laterally extending side brackets 2 on which are swiveled castors 3 and ball bearings 4.

One end of the tank is provided with a U-shaped handle 5 welded to the sides of the tank at 6 so that the tank is reenforced but not weakened.

Mounted on top of the tank by welding are a pair of spaced transverse saddles 7 which form supports respectively for the electric motor 8 and the compressor 9 which are joined together by the bolts 10 to form a unitary structure. The pipe 11 communicates the air pressure from the compressor to the tank 1 while the cable 12 supplies the electric current to the motor 8. 13 is a delivery line for the compressed air from the tank 1.

It will be understood that I desire to comprehend within my invention such modifications as may be necessary to adapt it to varying conditions and uses.

Having thus fully described by invention, what I claim as new and desire to secure by Letter Patent, is:

1. In combination, a tank, a pair of castor wheels at each end of said tank, a motor and compressor unit mounted on said tank, a handle mounted on said tank adapted to permit the moving and guiding of the combination and the balancing of the combination on a portion of the wheels under the tank.

2. In combination, a horizontal tank, castor wheels disposed beneath at each end of said tank, a handle welded to one end of said tank extending above it whereby the handle may be used to guide the tank or to elevate one end of it so that it can be balanced upon wheels under one end of the tank.

3. In combination, a horizontal tank, wheels disposed beneath at either end of said tank, a handle mounted on one end of said tank extending above it whereby the handle may be used to guide the tank or to elevate one end of it so that it can be balanced upon wheels under one end of the tank, and a compressor and motor unit supported on top of said tank by transverse saddles attached at their ends to the tank and spaced equidistant between the ends thereof.

4. In combination, a horizontal tank, laterally extending brackets attached to and extending from the lower sides of said tank, castors carried on said brackets, transverse saddles attached at each of their ends to the tank and supported in spaced relation to the top of said tank, a motor and compressor unit mounted on said saddles.

5. In combination, a horizontal tank, laterally extending brackets welded to and extending from the lower sides of said tank, castors carried on said brackets, transverse saddles welded at each end to said tank and supported in spaced relation to the top of said tank, a motor and compressor unit attached to and supported on said saddles, and a vertically disposed handle welded to the sides of said tank and extending above it at one end thereof.

6. In combination, a cylindrical tank arranged horizontally, laterally extending ears welded to said tank at each end thereof and on each side along the lower portions thereof, swivel castors mounted on said ears, and a U-shaped handle having its free ends welded to the curved sides of the tank at one end thereof.

7. In combination, a cylindrical tank arranged horizontally, laterally extending ears at both ends and on both sides of the lower portions of said tank, swiveled castors mounted on said ears, a U-shaped handle having its free ends welded to the curved sides of the tank at one end thereof, transverse saddles having flat upper surfaces mounted on the tank at equidistant points from the ends thereof, a motor mounted on one of said saddles, a compressor mounted on the other of said saddles, and means for connecting said motor and said compressor together between said saddles.

In testimony whereof, I affix my signature.

EDWARD A. HOBART.